United States Patent Office 3,068,201
Patented Dec. 11, 1962

3,068,201
PROCESS FOR MODIFYING MONOOLEFIN/CARBON MONOXIDE POLYMERS
Rudolph Henry Michel, Tonawanda, N.Y., assignor to E. I. du Pont de Nemours and Company, Wilmington, Del., a corporation of Delaware
No Drawing. Filed Nov. 16, 1960, Ser. No. 69,564
7 Claims. (Cl. 260—63)

This invention relates to monoolefin/carbon monoxide polymers, and more particularly to a method for modifying such polymers and to the modified polymers resulting.

There has been a considerable interest in monoolefin/carbon monoxide polymers, particularly ethylene/carbon monoxide polymers, chiefly because of the availability and relatively low cost of the starting materials from which these polymers are made. However, maximum utilization of these polymers has not been accomplished because they are deficient in certain properties such as tensile strength, elongation, dye-receptivity, etc., particularly desirable in shaped structures such as films, filaments, fibers, etc.

It is therefore an object of this invention to provide a simple and practical method for modifying, in general, the properties of monoolefin/carbon monoxide polymers, particularly in such a manner as to increase the potential utility of these polymers in the form of shaped structures. A more specific object is to provide a simple and practical method for modifying monoolefin/carbon monoxide polymers so as to enhance the tenacity, elongation-at-break, dye-receptivity and other properties of film, filaments, fibers and like shaped structures formed from said polymers. The foregoing and related objects will more clearly appear from the description which follows.

These objects are realized by the present invention which, briefly stated, comprises reacting as the sole reactants, (1) monoolefin/carbon monoxide polymers, said monoolefin containing from 2 to 4 carbon atoms, inclusive with (2) hydrazoic acid, in the presence of an acid catalyst selected from the group consisting of sulfuric acids, trifluoroacetic acid, trichloroacetic acid, sulfoacetic acid, hydrochloric acid, phosphoric acids, phosphorous trichloride, phosphorous oxychloride, phosphorous pentoxide, phosphorous pentachloride, thionyl chloride, ferric chloride, stannic chloride, aluminum chloride and boron trifluoride at a temperature and for a time below the temperature and time at which substantial degradation of the polymer occurs, whereby a modified monoolefin/carbon monoxide polymer is obtained.

The monoolefin/carbon monoxide polymers employed in the process of this invention are familiar to the art and, in general, are formed by polymerizing a monoolefin containing from 2 to 4 carbon atoms, inclusive, such as ethylene, propylene, isobutylene or mixtures of said monoolefins, with carbon monoxide in the presence of a polymerization catalyst. Procedures by which these polymerizations may be successfully carried out are described in the following U.S. patents: 2,391,920; 2,405,950; 2,495,286; 2,519,791; and 2,641,590. Depending on polymerization conditions, including type and concentration of catalyst, reaction medium and the relative concentrations of starting materials, monoolefin/carbon monoxide polymers in which the mol ratio of monoolefin to carbon monoxide ranges from 1:1 to 150:1 may be produced.

It is to be understood that reference herein to hydrazoic acid and procedures for treating with hydrazoic acid are intended to include this reagent either as hydrazoic acid or in the form of one of its salts or a mixture of salts from which said acid may be generated in situ.

The preferred acid catalyst for purposes of this invention is sulfuric acid. Other strong acids heretofore employed as acid catalysts, and which may be used in place of sulfuric acid are trifluoroacetic acid, trichloroacetic acid, sulfoacetic acid, hydrochloric acid, phosphoric acids, phosphorous trichloride, phosphorous oxychloride, phosphorous pentoxide, phosphorous pentachloride, thionyl chloride, ferric chloride, stannic chloride, aluminum chloride and boron trifluoride.

Controlled contact between the reactants is most effectively realized by carrying out the reactions of this invention in an inert organic liquid or mixture of inert organic liquids as the reaction medium. In general, organic liquids capable of dissolving or swelling the polymers and which do not react chemically with the polymers, and further, which do not compete with the process by reacting with either hydrazoic acid or the acid catalyst may be employed in the operation of this invention. Representative of such liquids are chlorinated liquid hydrocarbon, benzene, dioxane, n-butylsulfone, etc. In the application of the process of this invention to shaped structures of monoolefin/carbon monoxide polymers, e.g., films, filaments, fibers, etc., reaction media selected should preferably be one capable of merely swelling the polymer. A preferred liquid medium capable of dissolving both hydrazoic acid and polymer is chloroform, and the invention will be hereinafter described with specific reference to this material where a reaction medium is employed.

In modifying monoolefin/carbon monoxide polymers according to the process of this invention any of a variety of procedures may be employed with like effect. Thus the polymer may be dissolved in a suitable reaction medium, e.g., chloroform, to which solution is added successively a quantity of a chloroform solution of hydrazoic acid and a quantity of acid catalyst. Conversely, a polymer/chloroform/hydrazoic acid solution may be added to the acid catalyst. Alternatively, hydrazoic acid may be generated in situ by adding sodium azide to a reaction vessel containing a chloroform solution of the polymer and a quantity of the acid catalyst. In each method the cessation of bubbling may be taken as an approximate indication of the end of the reaction. The polymer may be recovered by first aspirating the reaction vessel to remove volatiles, e.g., reaction medium and excess hydrazoic acid, following which the reaction mixture is poured on crushed ice and the solid precipitate washed free of acid and dried. Alternatively, the reaction mixture may first be poured on crushed ice following immediately by neutralization with a suitable base. Volatiles are then removed by evaporation or aspiration techniques and the polymer recovered in the usual manner. The technique employing prompt neutralization is preferred.

The process of this invention may be employed to modify such shaped structures as films, filaments, rods, tubes, etc. One method by which a modification of polymeric shaped structures may be accomplished involves first partially swelling the structure by immersion in a solvent solution of hydrazoic acid, followed immediately thereafter by briefly immersing this partially swollen structure in concentrated sulfuric acid. This latter step may be followed by washing with water to remove sulfuric acid and any excess hydrazoic acid. Subsequently any solvent remaining in the structure may be removed by extractive or volatilization techniques.

The reactions of the process of this invention are exothermic. Therefore, it is desirable to keep reaction temperatures as low as can conveniently be accomplished chiefly to avoid excessive volatilization of either the reaction medium or the primary reactant, viz. hydrazoic acid, which, in the pure state, boils at 37° C. at normal pressures.

In modifying monoolefin/carbon monoxide polymers according to the process of this invention, it is preferred to operate under conditions which preclude or at least minimize the possibility that degradative effects on the polymer may offset property improvements to be derived from the modification process itself. Although not so critical when operating the process of this invention to modify monoolefin/carbon monoxide polymer shaped structures, it is particularly important to avoid long exposures of the polymer to sulfuric acid (or other acid catalyst) when carrying out the modification process on polymers in solution. The degradative effect of such exposure appears to be more serious with the relatively higher molecular weight monoolefin/carbon monoxide polymers. Thus, lower temperatures, shorter reaction times and less prolonged exposures to strong acid catalysts are favored when dealing with this most important class of polymers in order to derive the utmost benefit from property changes brought about by the modification process itself.

The following examples of specific preferred embodiments are further illustrative of the principles and practice of this invention. In certain of the examples, the inherent viscosities of the polymers employed are reported both before and after the modification process is carried out. Inherent viscosity in each case was measured by dissolving the polymer in the specified solvent by violently agitating the mixture at an elevated temperature. The resulting solution was then cooled to a predetermined temperature, and the viscosity of the solution at that temperature was measured relative to that of the prescribed solvent treated in the same manner. The time of efflux through a viscosimeter is measured for the solvent (no polymer present) and the solution of polymer in solvent. Inherent viscosity is calculated as follows:

Let $T_0$ = solvent flow time in seconds
$T_1$ = solution flow time in seconds $$\text{Relative viscosity} = \frac{T_1}{T_0}$$

Inherent viscosity $$= \frac{\text{the natural logarithm of relative viscosity}}{C}$$

where C is the concentration expressed in grams of polymer per 100 milliliters of solution.

Except where otherwise specified, the following table shows the test temperature as well as the polymer concentration for inherent viscosity determinations in the indicated solvents.

Table 1

| Solvent | Test Temperature, °C. | Polymer Concentration, g./100 ml. |
|---|---|---|
| Tetrachloroethane | 30 | 0.25 |
| Cyclohexanone | 50 | 0.25 |

EXAMPLE 1

Into a three-necked flask equipped with a mechanical stirrer and an air condenser was placed 20 ml. of concentrated sulfuric acid, 2 ml. of fuming sulfuric acid and 5 grams of an ethylene/carbon monoxide polymer dissolved in 50 ml. of chloroform. The polymer had an average ethylene-to-carbon monoxide ratio of 11.6:1, an inherent viscosity in cyclohexanone of 0.22, and melted at about 65° C. While maintaining the temperature of the mixture in the flask between 35° C. and 45° C. by means of a water bath, one gram of sodium azide was added over a period of about 15 minutes. The reaction mixture was stirred for 2½ hours, at which time 0.5 gram of sodium azide was added. After an additional 45 minutes of stirring, the water bath and the air condenser were removed and the chloroform and excess hydrazoic acid removed from the reaction flask by aspirating for approximately 2 hours until bubbling ceased. The remaining reaction mixture was then poured over ice and the solid precipitate washed free of acid in a Waring Blendor, filtered and dried. The resulting modified polymer had an inherent viscosity in cyclohexanone of 0.10, and melted at about 85° C. A film melt-pressed from a sample of the treated polymer showed a 50% increase in tensile strength and a twelve-fold increase in percent elongation-at-break over a film melt-pressed from a sample of the untreated polymer.

EXAMPLE 2

A solution of 50 grams of the ethylene/carbon monoxide polymer employed in Example 1, in 400 ml. of chloroform was mixed with 100 ml. of a chloroform-hydrazoic acid solution containing 7 grams of hydrazoic acid per 100 ml. of solution. The mixture was placed in a drop funnel and added dropwise over a period of one hour to a mixture of 200 ml. of concentrated sulfuric acid, 20 ml. of fuming sulfuric acid and 100 ml. of chloroform in a one-liter three-necked flask equipped with stirrer and an air condenser. The temperature of the reaction mixture was maintained between 40° C. and 45° C. by means of a water bath. Stirring was continuous both during and after the drop-wise addition. One hour after the completion of the addition, the water bath and air condenser were removed and the chloroform and unreacted hydrazoic acid removed by aspirating. The polymer, recovered from the remaining reaction mixture by the technique described in Example 1 had an inherent viscosity of 0.18 in cyclohexanone.

A film melt-pressed from a sample of the treated polymer showed a 50% increase in tensile strength and a five-fold increase in percent elongation-at-break over a film melt-pressed from a sample of the untreated polymer.

EXAMPLE 3

Two grams of an ethylene/carbon monoxide polymer having an average ethylene-to-carbon monoxide ratio of 9.4:1, was dissolved in 60 ml. of chloroform and this solution added to 4.5 ml. of a chloroform-hydrazoic acid solution containing 8 grams of hydrazoic acid per 100 ml. of solution. The solution was stirred in a three-necked flask which was cooled by an ice bath. A mixture of 10 ml. of concentrated sulfuric acid and 1 ml. of fuming sulfuric acid was added dropwise to the above-described mixture over a period of about 15 minutes. The reaction mixture was continuously stirred during and after the drop-wise addition. Thirty minutes after the completion of this addition, crushed ice was added to the reaction mixture and the chloroform and excess hydrazoic acid removed by aspirating the flask. The polymer was washed free of acid and dried as previously described. Before treatment, the polymer had an inherent viscosity of 0.77 in tetrachloroethane and melted at about 104° C. After treatment, the polymer had an inherent viscosity of 0.27 in tetrachloroethane and melted at about 80° C. The sharp drop in inherent viscosity and melting point of the treated polymer suggests that the long exposure to sulfuric acid may have had some degradative effects on the relatively high molecular weight polymer employed. This is reflected in the fact that a film melt pressed from a sample of the treated polymer showed a 20% loss in tensile strength and 30% loss in percent elongation-at-break compared to a film melt pressed from a sample of the untreated polymer.

EXAMPLE 4

A 4-mil thick piece of film melt pressed from a sample of the initial ethylene/carbon monoxide polymer employed in Example 1 was placed in a small Erlenmeyer flask and covered with 20 ml. of a saturated solution of hydrogen chloride in dioxane. A quantity of powdered sodium azide equal to about twice the weight of the film was added to the flask and the mixture allowed to sit overnight, i.e., about 20 hours at room temperature. At the end of this time the film was removed from the flask, washed thoroughly with water for about an hour and then dried. In a simple dyeing test, the treated film sample and a sample of the original film before treatment were immersed briefly in a warm aqueous solution of 1-amido-4-anilino-2-anthraquinone sulfonic acid. On removal of the film samples from the dye bath, they were washed with water. The treated film had been dyed a rich blue color while the untreated film was not noticeably changed from its original water white transparency.

EXAMPLE 5

Into a 250 ml. three-necked flask equipped with a mechanical stirrer and an air condenser was charged a solution consisting of one gram of an ethylene/carbon monoxide polymer having an ethylene-to-carbon monoxide ratio of 8:1 dissolved in 100 ml. of chloroform. While the temperature of the contents of the flask was maintained at 45° C., 3 ml. of a chloroform-hydrazoic acid solution containing 7.5 grams of hydrazoic acid per 100 ml. of solution was added to the contents of the flask, accompanied by continual stirring. While stirring continued, a mixture of 18 ml. of concentrated sulfuric acid and 2 ml. of fuming sulfuric acid was added rapidly to the contents of the flask. The reaction mixture was stirred for five more minutes. Volatiles were then removed by aspirating the flask for several hours. Water was added to the flask and the polymer recovered and washed in a running stream of water, followed by drying overnight at a temperature in the range of about 40–50° C. The untreated polymer had an inherent viscosity of 0.88 in tetrachloroethane (measured at 50° C.) while the treated polymer had an inherent viscosity of only 0.26 in tetrachloroethane (also measured at 50° C.) This sharp drop in inherent viscosity, and, by inference, in molecular weight is ascribed to the degradative effects caused by the prolonged exposure to concentrated sulfuric acid, i.e., reaction time plus time necessary to remove volatiles prior to recovery and washing of the polymer. The treated polymer was not further characterized but a sample of the untreated polymer was subjected to a modified treatment as described in the following example.

EXAMPLE 6

Employing the equipment, the polymer and proportions of reactants used in Example 5, the procedure was repeated with the following exceptions. The contents of the flask were maintained at 27° C. and the sulfuric acid mixture added dropwise with rapid stirring over a period of 3½ minutes. One and ½ minutes after the completion of the addition of the sulfuric acid mixture, the entire reaction mixture was poured on ice and rapidly adjusted to a pH of 8 by additions of a saturated aqueous solution of sodium bicarbonate, accompanied by vigorous stirring. The chloroform layer was repeatedly washed with distilled water, following which the chloroform was allowed to evaporate at room temperature. The polymer recovered was dissolved in hot chloroform and reprecipitated from methanol. The solid material was filtered off and dried at 50° C. for several hours. The treated polymer had an inherent viscosity of 0.84 in tetrachloroethylene (measured at 50° C.). Films melt pressed from the treated and untreated polymers are compared below showing significant improvements in several properties caused by the treatment.

Table 2

| Film Property | Untreated Polymer | Treated Polymer |
|---|---|---|
| Tensile Modulus, p.s.i. | 16,900 | 20,300 |
| Percent Elongation at break | 280 | 210 |
| Tensile Strength, p.s.i. | 1,000 | 1,400 |
| Melting Point, ° C. | 95 | 97 |

It will be apparent from the foregoing description and examples that the present invention provides a simple, economical, and altogether practical process for modifying monoolefin/carbon monoxide polymers whereby to enhance properties of the polymers and greatly increase their field of usefulness.

I claim:
1. The process which comprises reacting as the sole reactants (1) a monoolefin/carbon monoxide polymer in which the mol ratio of monoolefin to carbon monoxide ranges from 1:1 to 150:1, said monoolefin containing from 2 to 4 carbon atoms, inclusive, with (2) hydrazoic acid, in the presence of an acid catalyst selected from the group consisting of sulfuric acids, trifluoroacetic acids, trichloroacetic acid, sulfoacetic acid, hydrochloric acid, phosphoric acids, phosphorous trichloride, phosphorous oxychloride, phosphorous pentoxide, phosphorous pentachloride, thionyl chloride, ferric chloride, stannic chloride, aluminum chloride and boron trifluoride; at a temperature and for a time below the temperature and time at which substantial degradation of the polymer occurs, whereby a modified monoolefin/carbon monoxide polymer is obtained, which in the form of a shaped structure has substantially enhanced tensile strength, elongation, and dye-receptivity.

2. The process which comprises reacting as the sole reactants (1) an ethylene/carbon monoxide polymer in which the mol ratio of ethylene to carbon monoxide ranges from 1:1 to 150:1 with (2) hydrazoic acid, in the presence of an acid catalyst selected from the group consisting of sulfuric acids, trifluoroacetic acid, trichloroacetic acid, sulfoacetic acid, hydrochloric acid, phosphoric acids, phosphorous trichloride, phosphorous oxychloride, phosphorous pentoxide, phosphorous pentachlride, thionyl chloride, ferric chloride, stannic chloride, aluminum chloride and boron trifluoride; at a temperature and for a time below the temperature and time at which substantial degradation of the polymer occurs, whereby a modified monoolefin/carbon monoxide polymer is obtained, which in the form of a shaped structure has substantially enhanced tensile strength, elongation, and dye-receptivity.

3. The process of claim 2 wherein said ethylene/carbon monoxide polymer is in the form of a shaped structure.

4. The process of claim 2 wherein said ethylene/carbon monoxide polymer is in the form of film.

5. The process which comprises reacting as the sole reactants (1) a monoolefin/carbon monoxide polymer in which the mol ratio of monoolefin to carbon monoxide ranges from 1:1 to 150:1, said monoolefin containing from 2 to 4 carbon atoms, inclusive, with (2) hydrazoic acid, in the presence of an acid catalyst selected from the group consisting of sulfuric acids, trifluoroacetic acid, trichloroacetic acid, sulfoacetic acid, hydrachloric acid, phosphoric acids, phosphorous trichloride, phosphorous oxychloride, phosphorous pentoxide, phosphorous pentachloride, thionyl chloride, ferric chloride, stannic chloride, aluminum chloride and boron trifluoride and an inert organic liquid as the reaction medium; at a temperature and for a time below the temperature and time at which substantial degradation of the polymer occurs, whereby a modified monoolefin/carbon monoxide polymer is obtained, which in the form of a shaped structure has substantially enhanced tensile strength, elongation, and dye-receptivity.

6. The process of claim 5 wherein the polymer is an ethylene/carbon monoxide polymer.

7. The process of claim 5 wherein the inert organic liquid is chloroform.

References Cited in the file of this patent

UNITED STATES PATENTS 2,526,637    Cupery  ---------------- Oct. 24, 1950

OTHER REFERENCES

Journal Am. Chem. Soc., 67, pages 1941–3, 1945.

Fost et al.: "Fiber Forming Acrylonitrile Polymers," as reported in Chem. Abs., 17,744(g), 1958.